(12) United States Patent
Wen et al.

(10) Patent No.: US 8,739,370 B2
(45) Date of Patent: Jun. 3, 2014

(54) CORD RELEASE OF WINDOW COVERING

(75) Inventors: Yu-Che Wen, Taoyuan County (TW); Chih-Yao Chang, Taichung (TW)

(73) Assignee: Nien Made Enterprise Co., Ltd., Taichung (TW)

( * ) Notice: Subject to any disclaimer, the term of this patent is extended or adjusted under 35 U.S.C. 154(b) by 10 days.

(21) Appl. No.: 13/176,961

(22) Filed: Jul. 6, 2011

(65) Prior Publication Data
US 2013/0007990 A1    Jan. 10, 2013

(51) Int. Cl.
*F16G 11/00* (2006.01)
*E06B 9/324* (2006.01)

(52) U.S. Cl.
USPC ........ 24/115 R; 24/115 F; 24/128; 160/178.2

(58) Field of Classification Search
CPC . E06B 9/326; E06B 9/324; E06B 2009/3265; A47H 3/00; A47H 3/02
USPC .............. 24/115 R, 122.3, 122.6, 128, 129 R, 24/132 R, 134 L, 135 R, 136 R, 136 K, 115 F, 24/115 G, 115 H, 115 K; 160/178.1 R, 178.2
See application file for complete search history.

(56) References Cited

U.S. PATENT DOCUMENTS

| | | | | |
|---|---|---|---|---|
| 1,044,302 A * | 11/1912 | Underhill | ...................... | 119/811 |
| 4,426,754 A * | 1/1984 | Smith et al. | ................. | 24/17 AP |
| 4,453,353 A * | 6/1984 | Killop et al. | .................... | 52/147 |
| 5,560,414 A * | 10/1996 | Judkins et al. | ......... | 160/178.1 R |
| 5,562,140 A * | 10/1996 | Biba | ....................... | 160/178.1 R |
| 8,104,146 B2 * | 1/2012 | Wen | ............................. | 24/115 F |
| 8,132,299 B2 * | 3/2012 | Zhang | .......................... | 24/115 F |

* cited by examiner

*Primary Examiner* — Robert J Sandy
*Assistant Examiner* — Michael Lee
(74) *Attorney, Agent, or Firm* — Tracy M Heims; Apex Juris, pllc

(57) ABSTRACT

A cord release of the present invention includes two cases engaged together to form a shell with a top opening at a top thereof. At least one of the cases is provided with a guiding member at a top thereof, and the guiding member is located at a junction of the cases. The guiding member has a guiding face with a convex surface facing the center of the top opening. Therefore, the guiding member may lead the cords to opposite sides of the top opening, which are located away from the junction of the case, to disengage the cases easily.

10 Claims, 10 Drawing Sheets

CORD RELEASE OF WINDOW COVERING

BACKGROUND OF THE INVENTION

1. Field of the Invention

The present invention relates generally to a window covering, and more particularly to a cord release of a window covering.

2. Description of the Related Art

FIG. 1 and FIG. 2 show a conventional cord release 1 for a window covering to connect a plurality of cords 4 and a rope 5. The cord release 1 thus can collect the cords together and at the same time user may operate the rope 5 to fold or unfold the window covering.

The cord release 1 includes two semi-circular cases 2 and 3 with their bottoms connected together. The case 2 has a pair of blocks 2a to engage slots 3a on the case 3. The cord release 1 has a round opening 1a on a top thereof when the cases 2 and 3 are engaged. The cords 4 enter the cord release 1 through the opening 1a, and some of the cords 4 are fastened with a rib 2b on an inner side of the case 2, and the rest cord 4 passes through a hole 2c and ties a knot so that the cords 4 are connected to the cord release 1.

Kids may play with the cords and strangled by the cords 4. When the kid struggles, it may disengage the case 2 away with case 3 of the cord release 1 that he/she may escape from the cords 4. However, when the kid struggles, the cords may be forced to push against the round opening 1a. But since the opening 1a is round, the force can't concentrate at the exact location at the opening 1a to disengage the cases 2 and 3. The best location that the cords shall push against the opening 1a so to disengage the cases 2 and 3 is perpendicular to the junction plane of the cases 2 and 3 when they are engaged together. Any delay in disengagement may increase the danger or hurt to the strangled kid.

Besides, even when the cases 2 and 3 are disengaged, since some of the cord 4 are tied together with case 2, the cords 4 may still remain in the hole 2c and entangled with other cords 4 to strangle the kid.

SUMMARY OF THE INVENTION

The primary objective of the present invention is to provide a cord release of a window covering, which may guide the cords to disengage the case when the kid is strangled between the cords.

According to the objective of the present invention, a cord release for a window covering includes a plurality of cases engaged together to form a shell with a top opening at a top thereof. A plurality of cords enter the shell through the top opening. At least one of the cases is provided with a guiding member at a top thereof, and the guiding member is located at a junction of the cases. The guiding member has a guiding face with a convex surface projecting towards the center of the top opening.

In an embodiment, the top opening of the shell is elliptical with a long axis and a short axis, and the junction of the cases is on the short axis.

In an embodiment, the guiding member is projected from an edge of one case to engage a connecting member provided on the other case. It is preferable that the guiding member has a recess to engage a protrusion on the connecting member.

In an embodiment, one of the cases has a first bore and a second bore on a bottom thereof, and the other case has a third bore on a bottom thereof that a rope passes through the first bore, the third bore, and the second bore in sequence. It is provided with a guiding slot or two blocks on the bottom to keep the rope section exposed outside at the bottom of the cord cases from entangling with the end portion of the rope pulled out from the cord release.

In an embodiment, the cases are provided with a cord fastener respectively, each of which has two slots. Each slot has an open end that the cord received in the slot may escape from the slot through the open end when the cases are disengaged. It is preferred that each cord fastener is provided with a wall underneath each slot to hold the cord.

The present invention further provides a cord release to connect a plurality of cords and a rope. The cord release includes at least two cases engaged together to form a shell with a top opening. The cords enter the shell through the top opening. One of the cases has a first bore and a second bore on a bottom thereof, and the other case has a third bore on a bottom thereof. The rope passes through the first bore, the third bore, and the second bore in sequence.

DETAILED DESCRIPTION OF THE INVENTION

Figure 1:
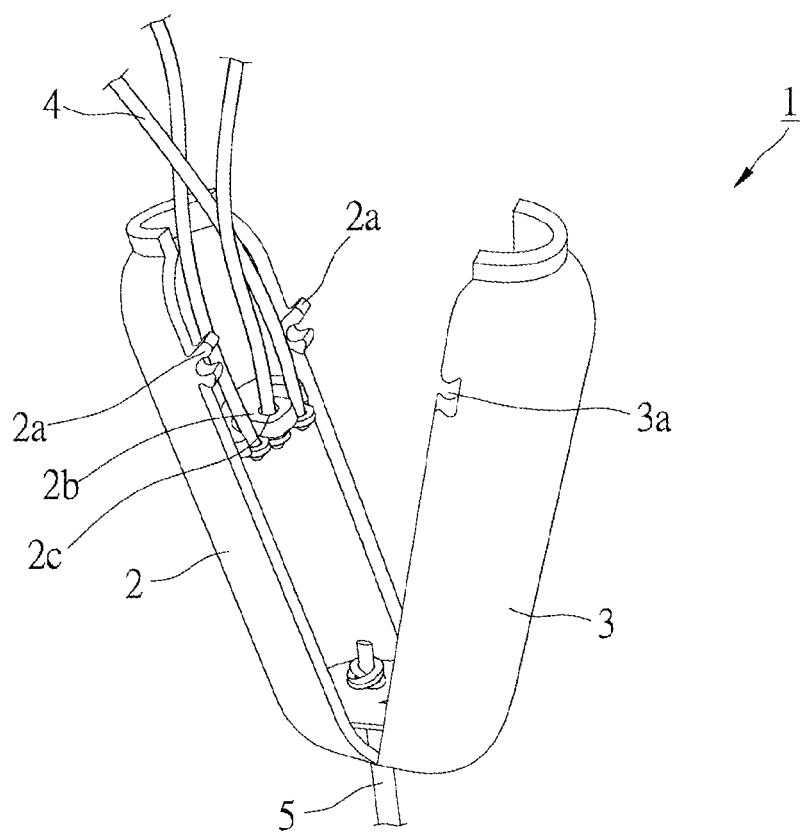
FIG. 1 is a perspective view of the conventional cord release.
Figure 2:
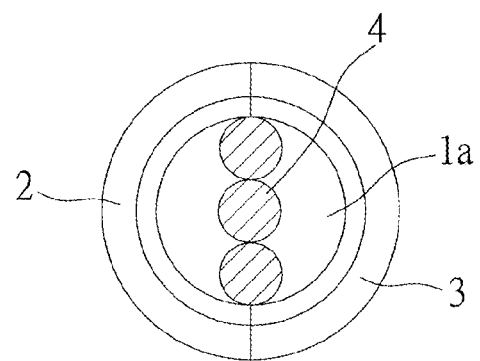
FIG. 2 is a top view of the conventional cord release.
Figure 3:
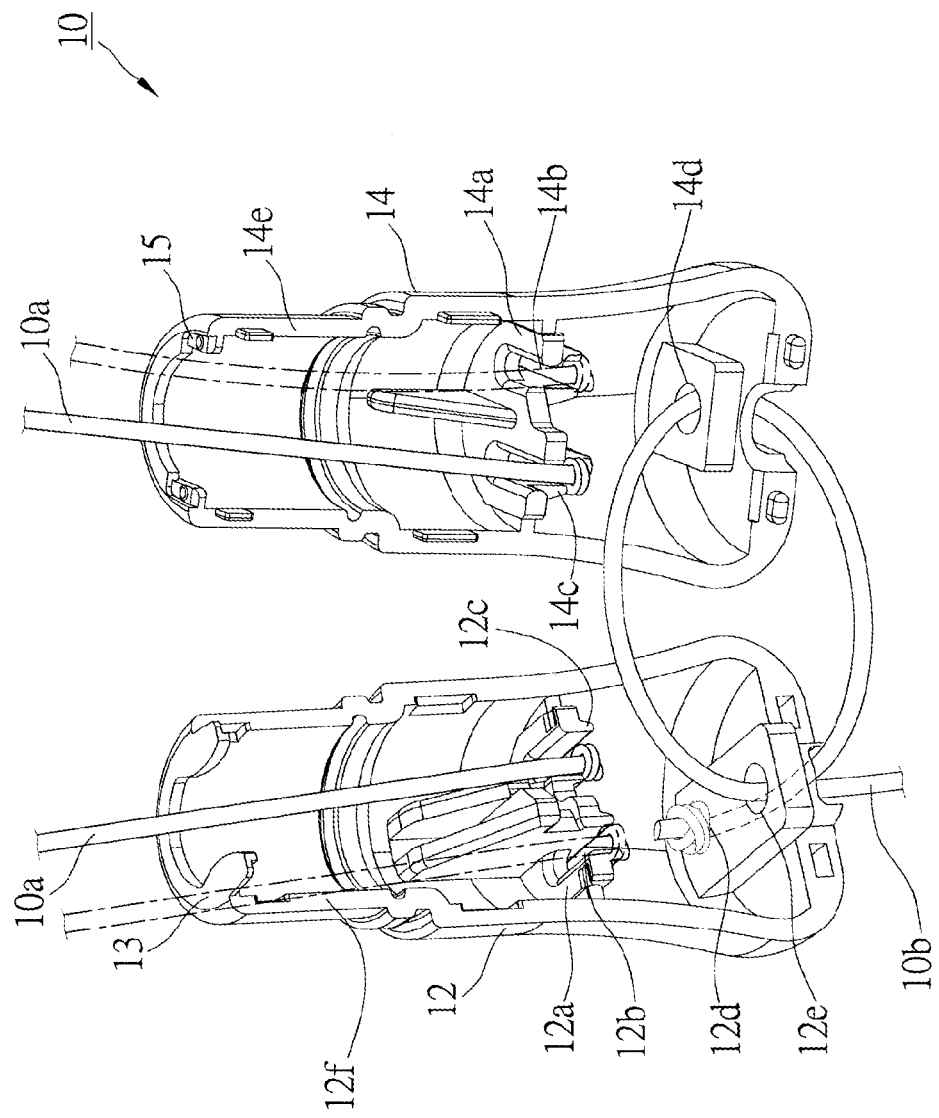
FIG. 3 is a perspective view of a first preferred embodiment of the present invention in the disengaged condition.

As shown in FIG. 3, a cord release 10 of the first preferred embodiment of the present invention includes two cases 12 and 14 engaged together by several pairs of blocks and slots on the cases 12, 14 to form a shell. The way of engaging and disengaging the cases 12, 14 is not the main character of the present invention, so we'll not describe in detail here.

The cases 12, 14 respectively have a cord fastener 12a, 14a on an inner side thereof. Each cord fastener 12a, 14a has two slots 12b, 14b with an open end to receive cords 10a. Each cord fastener 12a, 14a further has walls 12c, 14c projected from bottom edges of the slots 12b, 14b to hold knots of the cords 10a when the cases 12, 14 are engaged, and the cords 10a may easily escape from the slots 12b, 14b of the cord fastener 12a, 14a via the open ends when the cases 12, 14 are disengaged.

Figure 4:
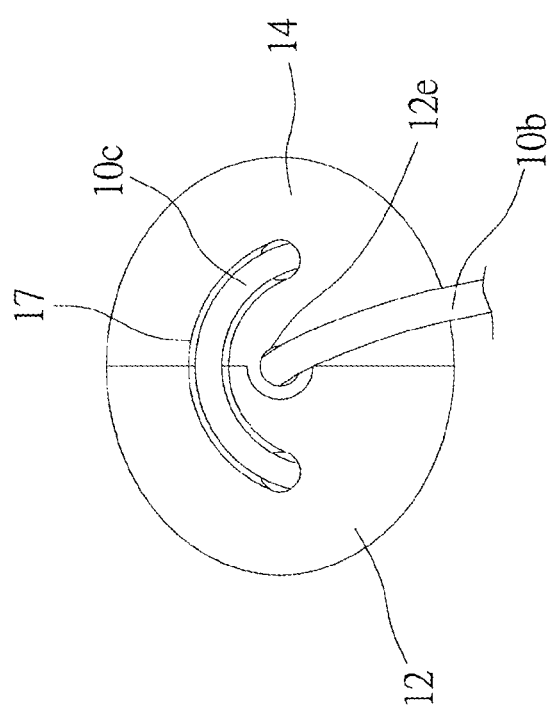
FIG. 4 is a bottom view of FIG. 3.

The case 12 has a first bore 12d and a second bore 12e on a bottom thereof, and the case 14 has a third bore 14d on a bottom. A rope 10b has a knot in one of its end. The unknotted end of the rope 10b passes through the first bore 12d from within the case 12 out toward the outside of the cord release 10 bottom, and then passes through the bore 14d upwardly, and downwardly through the second bore 12e in sequence out toward the bottom of the cord release 10, so to be used as the pulling rope 10b. As shown in FIG. 4, the shell has a curved guiding slot 17, a half of which is on the case 12 and the other half of which is on the case 14, on a bottom thereof with opposite ends communicated with the first bore 12d and the bore 14d to receive a section of the rope 10b between the first bore 12d and the bore 14d so that the rope 10b will not get entangled with that section.

Figure 5:
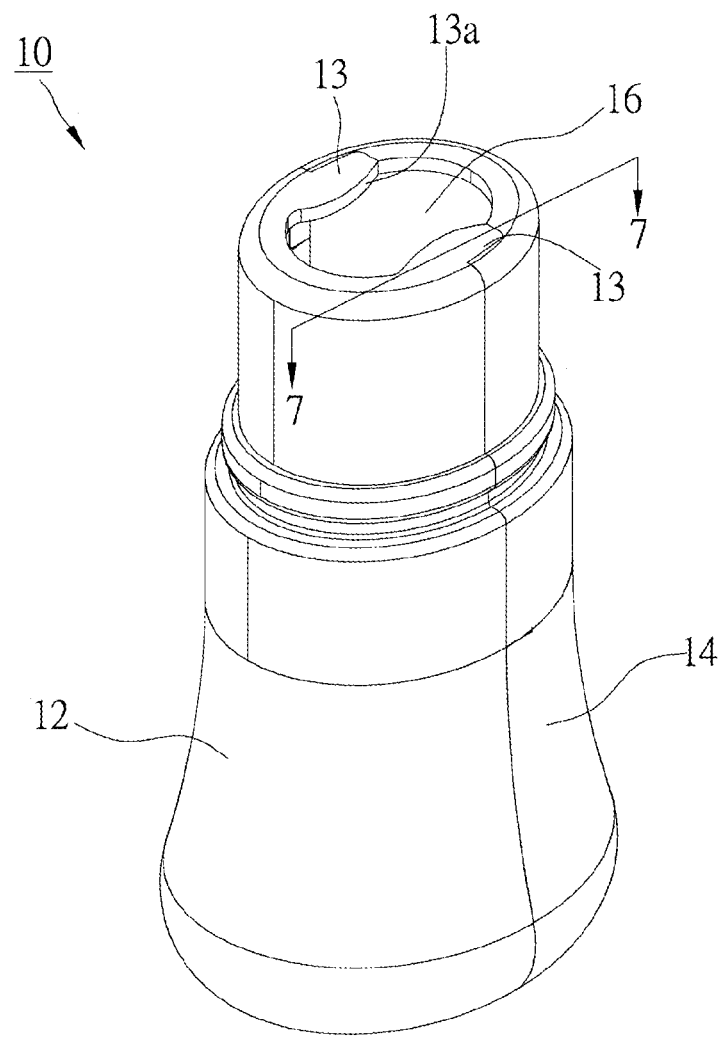
FIG. 5 is another perspective view of the first preferred embodiment of the present invention in the engaged condition.
Figure 6:
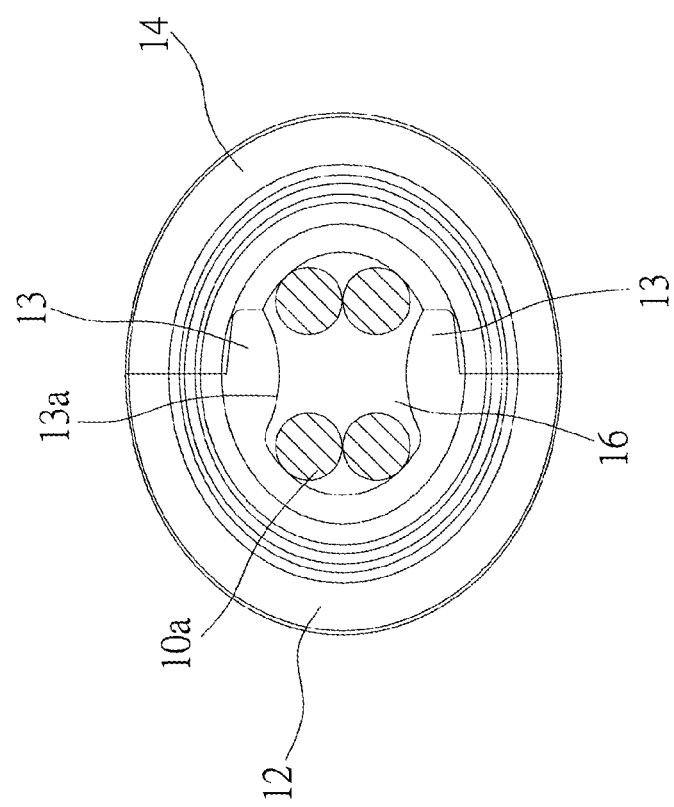
FIG. 6 is a top view of FIG. 5.
Figure 7:
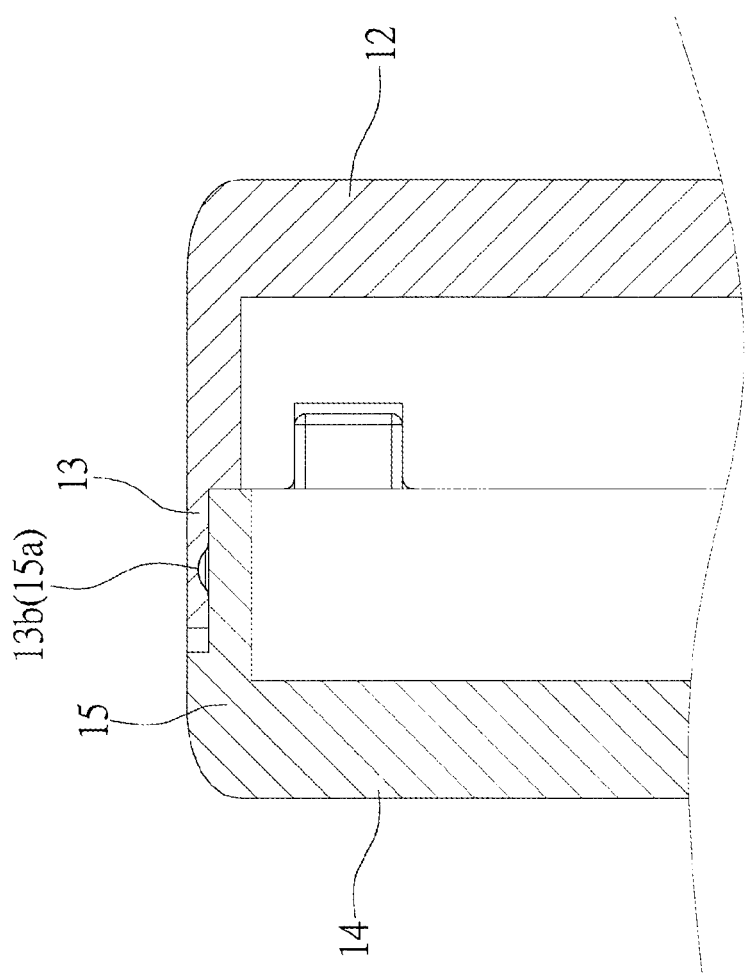
FIG. 7 is a sectional view along the 7-7 line of FIG. 5.

As shown in FIG. 5 and FIG. 6, the cord release 10 has a top opening 16 at a top of the shell. The cords 10a enter the shell through the top opening 16. The top opening 16 is an elliptical opening with a long axis and a short axis. The case 12 has two guiding members 13 on an inner side of a top thereof. The guiding members 13 are projected from an edge 12f of the case 12. Each guiding member 13 has a guiding face 13a with a convex surface facing a center of the top opening 16. The case 14 has two connecting members 15 which are plates on a top of an edge 14e of the case 14. As shown in FIG. 7, each guiding member 13 has a recess 13b, and each connecting member 15 has a protrusion 15a to be engaged with the corresponding recess 13b of the guiding member 13 when the cases 12, 14 are engaged. The shell has a junction plane between edges 12f, 14e of the cases 12, 14 when the cases 12, 14 are engaged, and the guiding members 13 are covering the junction plane. The short axis of the top opening 16 is on the junction plane also. As a result, when the cords 10a are forced to move, they will move to the opposite ends of the long axis of the top opening 16 respectively where it is perpendicular to the junction plane to disengage the cases 12, 14 directly. After the cases 12, 14 are disengaged, the cords 10a will leave the slots 12b, 14b of the cord fasteners 12a, 12b via the open ends then the kid may escape from the cords 10a without any trouble.

Figure 8:
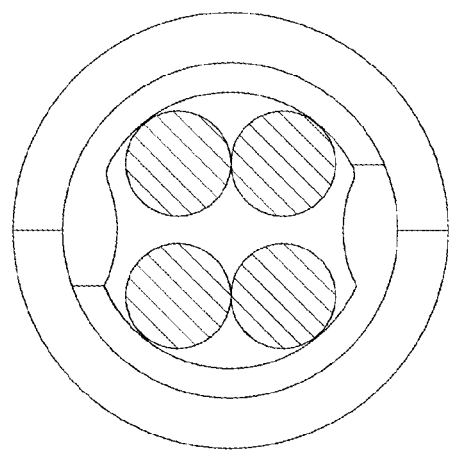
FIG. 8 is a perspective view of a second preferred embodiment of the present invention in the disengaged condition.
Figure 9:
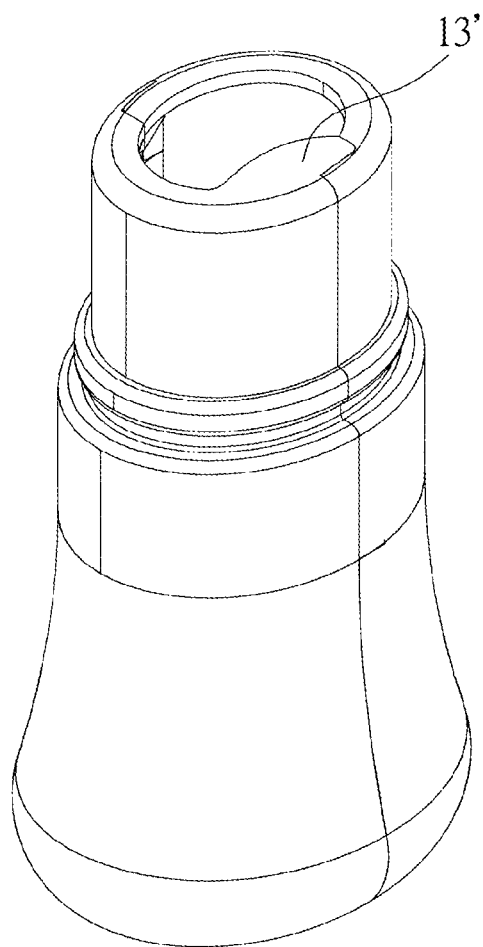
FIG. 9 is a perspective view of a third preferred embodiment of the present invention in the disengaged condition.

The first embodiment provides the two guiding members on the same case. As shown in FIG. 8, a cord release of the second preferred embodiment of the present invention has two cases, each of which has a guiding member and a connecting member. The guiding members may guide the cords 10a to the opposite ends of the long axis of the elliptical top opening. FIG. 9 shows the third preferred embodiment of the present invention, in which only one guiding member 13' is provided on the junction of the case. However, it serves the same function as above.

Figure 10:
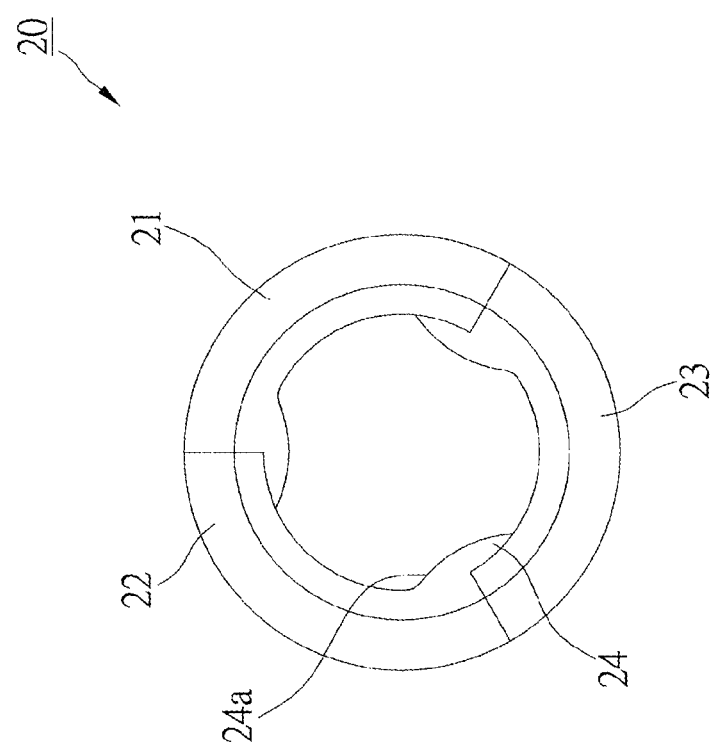
FIG. 10 is a top view of a fourth preferred embodiment of the present invention in the disengaged condition.

As shown in FIG. 10, a cord release 20 of the fourth preferred embodiment of the present invention has three cases 21, 22, and 23 engaged together to form a shell. The same as above, each case 21, 22, and 23 has a guiding member 24 with a guiding face 14, and the guiding members 24 are located at junctions between the neighboring cases 21, 22, and 23. The guiding members 24 serve the same function as above. Besides, the top opening of the cord release 20 can be round.

Figure 11:
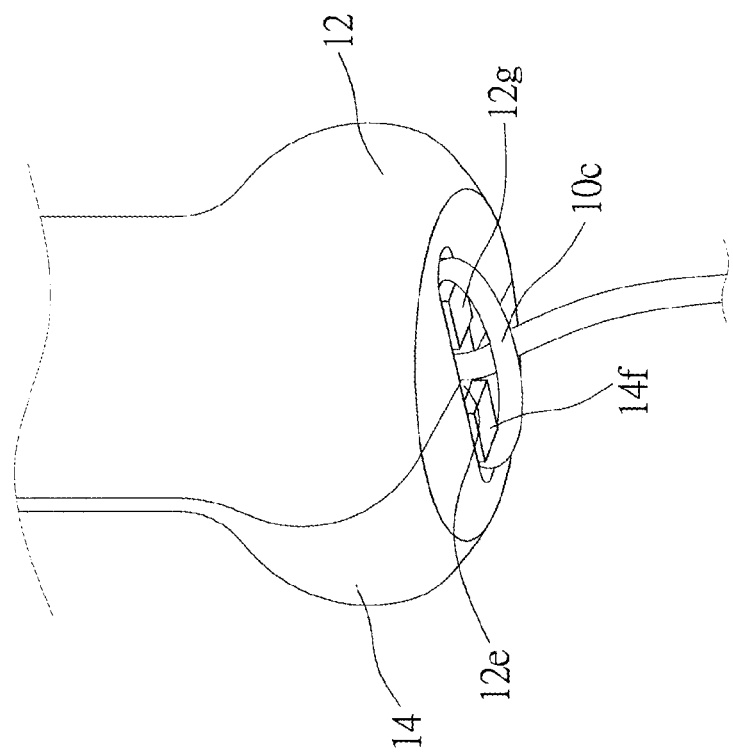
FIG. 11 is similar to FIG. 4, showing the blocks on the bottom of the case.

FIG. 11 shows another structure for facilitating the rope 10b to pass through the bore 12e. It provides blocks 12g and 14f on a bottom of each case 12, 14. The blocks 12g and 14f are located at opposite sides of the second bore 12e. A section 10c of the rope 10b between the first bore and the bore crosses over the blocks 12g and 14f so that the rope 10b may pass through the second bore 12e easily.

The description above is only a few preferred embodiments of the present invention and the equivalence of the present invention is still in the scope of claim construction of the present invention.

What is claimed is:

1. A cord release for a window covering, comprising a plurality of cases engaged together to form a shell with a top opening at a top thereof that a plurality of cords enter the shell through the top opening; at least one of the cases having a guiding member at a top thereof for guiding the cords to opposite ends of said top opening; the guiding member located at a junction plane of the cases and having a guiding face with a convex surface facing a center of the top opening;
   wherein one of the cases has a first bore and a second bore on a bottom thereof, and the other case has a bore on a bottom thereof that a rope passes through the first bore, the bore, and the second bore in sequence.

2. The cord release as defined in claim 1, wherein the top opening of the shell is an elliptical opening with a long axis and a short axis, and the junction of the cases is on the short axis.

3. The cord release as defined in claim 1, wherein the guiding member is projected from an edge of the case to engage a connecting member provided on the other case.

4. The cord release as defined in claim 3, wherein the guiding member has a recess to engage a protrusion on the connecting member.

5. The cord release as defined in claim 1, wherein the shell has a guiding slot on a bottom thereof to receive a section of the rope between the first bore and the bore.

6. The cord release as defined in claim 1, wherein the shell has two blocks on a bottom thereof at opposite sides of the second bore.

7. The cord release as defined in claim 1, wherein the cases are provided with a cord fastener respectively, each of which has two slots, and each of the slots has an open end that the cord received in the slot escapes from the slot through the open end when the cases are disengaged.

8. The cord release as defined in claim 7, wherein the cord fastener has a wall beside each slot to hold the cord.

9. A cord release for a window covering to connect a plurality of cords and a rope where said rope has a first section and a second section, comprising at least two cases engaged together to form a shell with a top opening, wherein the cords enter the shell through the top opening; one of the cases having a first bore and a second bore on a bottom thereof, and the other case having a third bore on a bottom thereof; said first section of said rope passing through the first bore, the third bore, and the second bore in sequence;
   wherein the shell has a curved guiding slot on a bottom thereof to receive said second section of the rope between the first bore and the third bore to prevent entanglement of said first section of rope with the said second section of rope.

10. The cord release as defined in claim 9, wherein the shell has two blocks on a bottom thereof at opposite sides of the second bore.

\* \* \* \* \*